United States Patent
Maeda et al.

(10) Patent No.: US 6,556,546 B1
(45) Date of Patent: Apr. 29, 2003

(54) MULTIPLEX DATA TRANSMITTING AND RECEIVING EQUIPMENT

(75) Inventors: Akiyoshi Maeda, Sanda (JP); Hiroyuki Uenaka, Akashi (JP); Hidetoshi Takeda, Neyagawa (JP); Satoshi Kondo, Yawata (JP); Hiromu Kitaura, Osakasayama (JP); Yoshitaka Mitsui, Ibaraki (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/121,110

(22) Filed: Jul. 23, 1998

(30) Foreign Application Priority Data

Jul. 23, 1997 (JP) .............................. 9-196722
Jul. 23, 1997 (JP) .............................. 9-196723

(51) Int. Cl.$^7$ ................................... H04J 1/00
(52) U.S. Cl. ..................... 370/282; 370/486; 725/86; 725/105
(58) Field of Search ................................ 370/465, 313, 370/486, 282; 348/385, 584; 345/329, 302; 709/218, 217; 386/95; 725/147, 105, 86, 76, 114, 116; 700/94; 382/251

(56) References Cited

U.S. PATENT DOCUMENTS

| | | | | |
|---|---|---|---|---|
| 5,537,141 A | * | 7/1996 | Harper et al. | 725/116 |
| 5,548,532 A | | 8/1996 | Menand et al. | 370/477 |
| 5,633,683 A | | 5/1997 | Rosengren et al. | 375/240.01 |
| 5,790,171 A | * | 8/1998 | Klopfer et al. | 725/147 |
| 5,790,173 A | * | 8/1998 | Strauss et al. | 725/114 |
| 5,826,102 A | * | 10/1998 | Escobar et al. | 345/302 |
| 5,966,385 A | * | 10/1999 | Fujii et al. | 370/465 |
| 5,973,722 A | * | 10/1999 | Wakai et al. | 725/76 |

FOREIGN PATENT DOCUMENTS

| | | |
|---|---|---|
| EP | 696 853 A2 | 2/1996 |
| EP | 782 332 A2 | 7/1997 |

OTHER PUBLICATIONS

"The IEEE–1394 High Speed Serial Bus"; R. H. J. Blocks; 1996; pp. 209–216; Philips Journal of Research, vol. 50, No. 1/2.

* cited by examiner

Primary Examiner—Hassan Kizou
Assistant Examiner—John Pezzlo
(74) Attorney, Agent, or Firm—Rossi & Associates

(57) ABSTRACT

In transmission and reception of signals in which audio data and management information used in playback are mingled, such as the data recorded in DVD or other recording media, this is to present means for separating the information into video and audio data and management information used in playback, so that the reception side can make use of various playback functions, such as a playback of original picture and sound information, a change of playback procedure, and a selection of playback information. At the transmission side, the data packet transforming means generates a first packet stream from transmission data. Consequently, the transmission packet generating means inserts packets generated from the playback management information by playback management information packet transforming means into the first packet stream at a specified rate, and generates a second packet stream. This is transmitted by using communication media as designated in IEEE1394 or the like. At the reception side, the signal acquired in the receiving means is separated into a packet stream of data and packets of playback management information in the packet identification means, so that the playback data is restored from the packet stream of data on the basis of the management information.

3 Claims, 12 Drawing Sheets

MULTIPLEX DATA TRANSMITTING AND RECEIVING EQUIPMENT

BACKGROUND OF THE INVENTION

The present invention relates to a multiplex data transmitting equipment for sending transmission data and playback management information for utilizing it by using communication media, and a multiplex data receiving equipment for receiving reception data and playback management information for utilizing it by using the communication media.

A method called MPEG (Moving Picture Experts Group) is known as one of the methods of compressing digital video signals and digital audio signals. The MPEG system includes MPEG1 dealing with accumulation media with low bit rate, and MPEG2 realizing high picture quality of broadcast level and applicable to different screen sizes. In MPEG 2, the quantity of data processed per unit time is variable depending on the program or contents in order to vary the compression rate according to the screen size or required picture quality.

Moreover, as the standard of media using MPEG2, DVD (Digital Video Disc) standard is known. Concerning the information of digital video data or audio data compressed by MPEG2 system being readout from a disc conforming to the DVD standard, it is being requested to deliver the information to an external device by using a transmission channel, or feed it into other device from a device conforming to the MPEG2 or DVD standard.

Besides, in wireless and wired media, various methods have been proposed as means for transmitting digital video data and audio data conforming to MPEG2 or DVD standard.

As one of the means for transmitting such digital video data and audio data, for example, a system called IEEE 1394 High Performance Serial Bus (hereinafter called IEEE1394) is known. The IEEE1394 is the serial bus type communication media comprising both isochronous transmission mode capable of transferring real-time data necessary for transmission of video data and audio data, and asynchronous transmission mode.

The IEEE1394 operates on the basis of the period of every 125 microseconds (hereinafter called the cycle), and includes two transmission modes, that is, the isochronous transmission mode for transmitting data in one or a plurality of bands in the fore portion of each cycle, and the asynchronous transmission mode for transmitting data in the remaining time after isochronous transmission.

If real-time data transfer is necessary, as in the case of digital video data or audio data, the data is transferred by this isochronous transmission, and if real-time data transfer is not necessary, in case of such as some data or control information, they are transferred by the asynchronous transmission.

In the case of isochronous transmission, prior to the transmission, the time duration used in one cycle (that is, the bandwidth for transmitting data) must be acquired from the device (node) for controlling the band management. In the IEEE1394, there is one node for managing the band used in isochronous transmission on the bus, and a device (node) for using the band width must acquire the band width to be used from this band management node. The device (node) acquiring the band width can monopolize the transmission to the acquired band width.

Thus, the node for isochronous transmission can transmit the data in the band acquired in the communication media. The data transmitted by isochronous transmission is sent out as a packet (a serial data bit stream synchronized with the clock) determined in the IEEE1394. In isochronous transmission, real-time data can be transferred by transferring the quantity of data predetermined in each cycle.

However, in the disc conforming to the DVD standard, information conforming to MPEG2 such as digital video data and audio data, and procedure information and selection information for playing back the digital video data and audio data are recorded in mixture. In the information group having such a signal format, by using the procedure information and the selection information for playing back the digital video data and audio data, the digital video data and audio data are reordered and then demodulated to obtain the original video signal and audio signal. On the other hand, when transmitting or receiving the signal before such demodulation process in the case of IEEE1394 isochronous transmission or the like, the transmitting method and receiving method of the procedure information and the selection information for playing back the digital video data or audio data have not been established yet.

Therefore, in the case of transfer of mixed data of information such as digital video data and audio data, and the procedure information and the selection information for playing back the digital video data and audio data according to the IEEE1394, as in DVD, when the digital video data and audio data being read out from the information source such as DVD are transmitted or received directly through a transmission channel, they are demodulated in the sequence of transmission or reception from the transmission channel, and the original picture or sound information may not be played back, or the function such as a change of playback procedure or selection of playback information cannot be realized at the reception side, and it is being demanded to solve such problems.

SUMMARY OF THE INVENTION

The present invention is intended to solve the above problems, and it is an object thereof to present a multiplex data transmitting equipment capable of transmitting procedure information and selection information for playing back digital video data and audio data, together with digital video and audio data, and a multiplex data receiving equipment capable of receiving such data, in transmission and reception of mixed data comprising information of pictures and sounds such as data recorded in recording media such as DVD and management information used in playing back.

To achieve the object, in the multiplex data transmitting equipment of the invention, a second packet stream obtained by inserting a packet of playback management information generated from the playback management information consisting of procedure information and selection information for playing back the digital video data and audio data into a first packet stream generated from transmission data such as digital video data and audio data, with a predetermined rate, or a rate designated from the device for receiving the data, is transmitted in one band of communication media, so that the function of reproducing the original information of picture and sound, changing the playback procedure, or selecting the playback information can be realized at the reception side.

According to the multiplex data receiving equipment of the invention, when a packet stream inserting playback management information such as the procedure information and the selection information for playing back the data at a predetermined rate into data such as digital video data and audio data is transmitted in one band of the communication media, the data such as digital video data and audio data, and the playback management information for playing back the data are separated from the received packet stream, and by generating playback data of the original digital video data and audio data by using these signals, the information of the original picture and sound can be reproduced, and the function such as the change of playback procedure and the selection of playback information can be realized at the reception side.

The invention further presents, for the ease of reception and playback processing at the reception side, a multiplex data transmitting equipment having functions for adding an identifier and attribute information to the packet and blocks for composing the packet, transmitting the packet of playback management information prior to the packet of video and audio data, and transmitting the packet of playback management information in other band than the band for transmitting the packet of video and audio data, and a corresponding multiplex data receiving equipment. Moreover, to process according to various requests at the reception side, it also presents a multiplex data transmitting equipment capable of demanding a start or stop of transmission of the playback management information to the transmission side from the reception side, and a corresponding multiplex data receiving equipment.

DESCRIPTION OF THE PREFERRED EMBODIMENTS

The multiplex data transmitting equipment according to first to fifth embodiments of the invention is described below while referring to FIG. 1 through FIG. 7.

Figure 1:
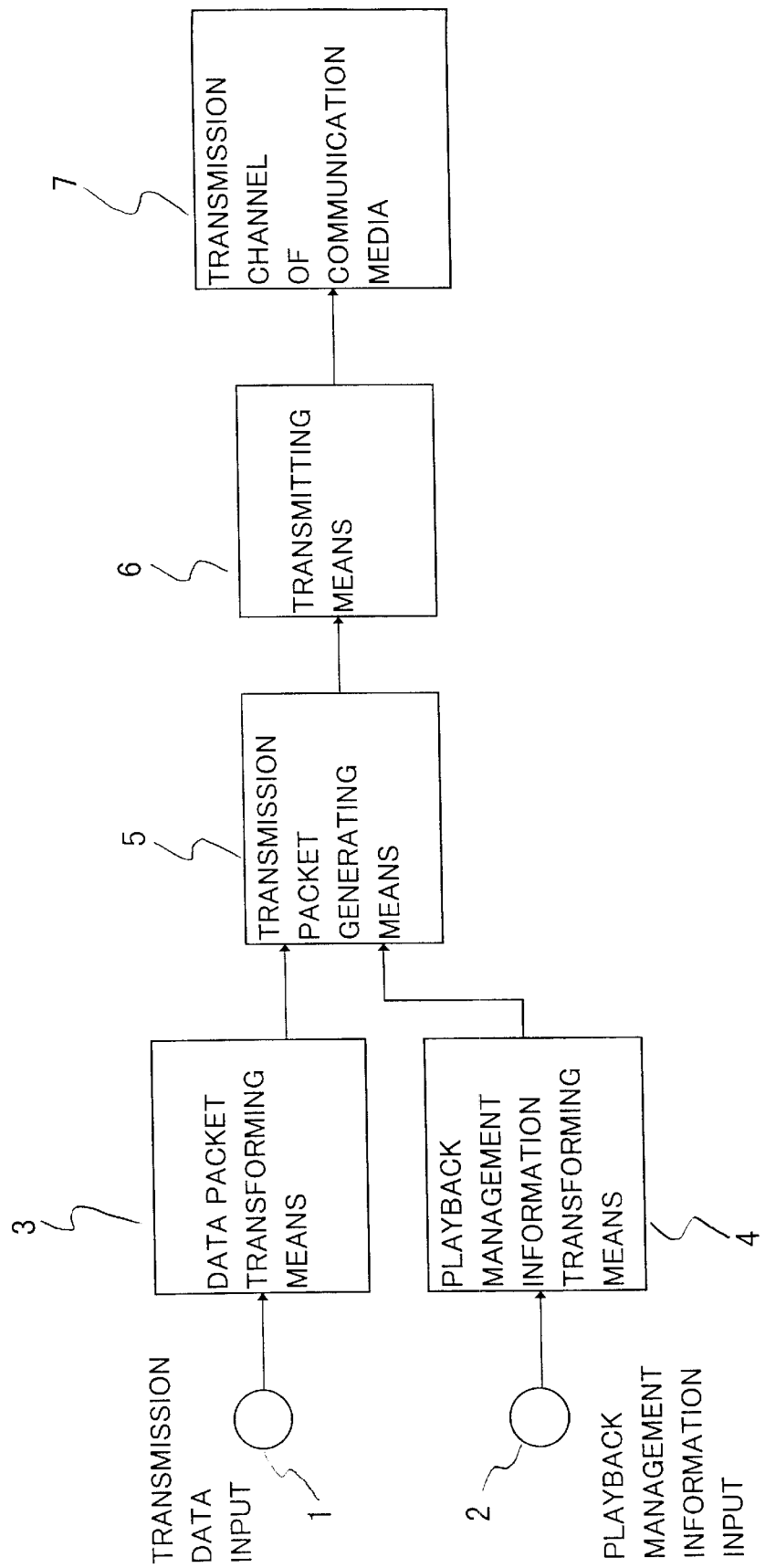
FIG. 1 is a block diagram of multiplex data transmitting equipment in a first embodiment of the invention.
Figure 2:
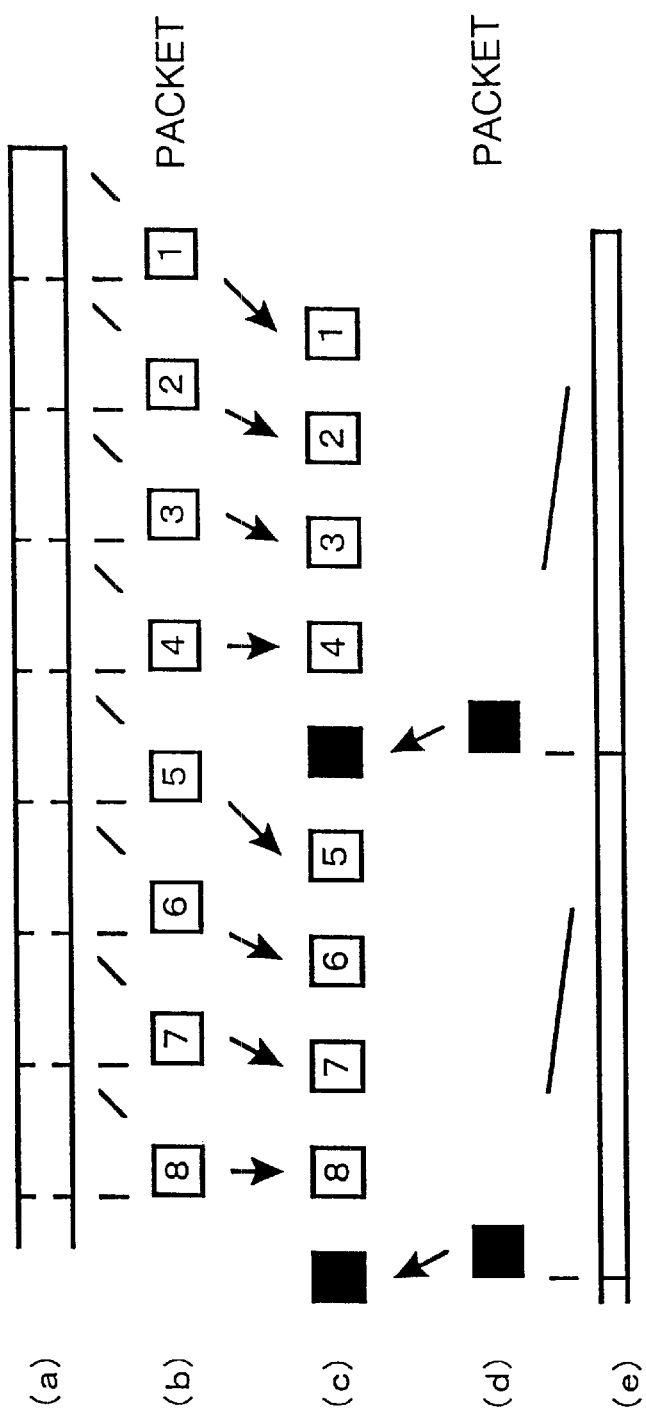
FIG. 2 is an operation explanatory diagram of the multiplex data transmitting equipment in the first embodiment of the invention.
Figure 3:
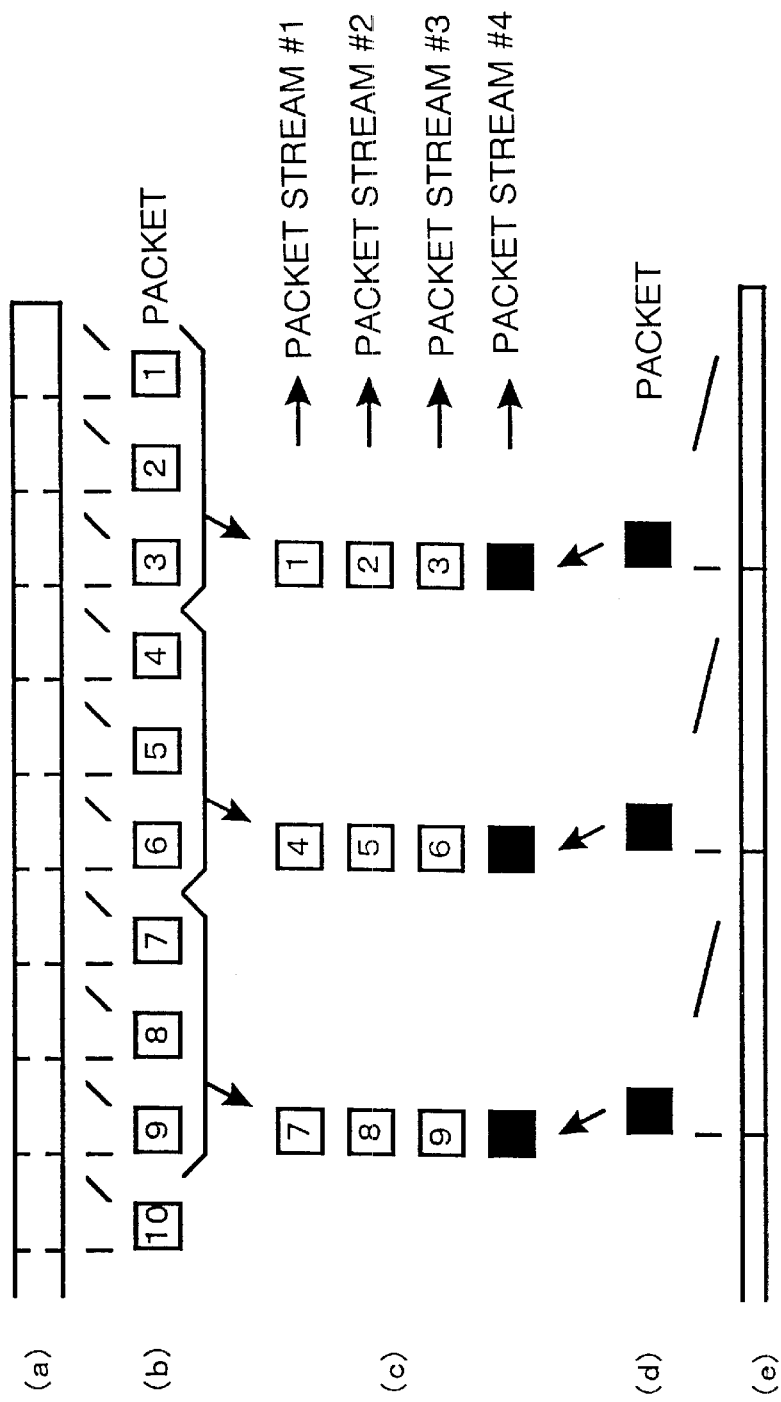
FIG. 3 is other operation explanatory diagram of the multiplex data transmitting equipment in the first embodiment of the invention.

FIG. 1 is a block diagram of a multiplex data transmitting equipment in a first embodiment of the invention, and FIG. 2 is an operation explanatory diagram for explaining the operation of the multiplex data transmitting equipment. In FIG. 1, reference numeral 1 is a transmission data input, 2 is a playback management information input, 3 is data packet transforming means, 4 is playback management information packet transforming means, 5 is transmission packet generating means, 6 is transmitting means, and 7 is a transmission channel of communication media.

In thus constituted multiplex data transmitting equipment, the operation is described while referring to FIG. 1 and FIG. 2.

Transmission data and playback management information data issued from memory media such as DVD are respectively fed into the transmission data input 1 and the playback management information input 2. Herein, the transmission data is the data including the information requested by the user such as picture and sound.

The transmission data fed into the transmission data input 1 shown in FIG. 2(a) is transformed by the data packet transforming means 3 as shown in FIG. 2(b) into a packet stream with a transmission format suited to transmission in a band acquired in the communication media, or, in this case, the band acquired in the transmission channel 7 of the communication media.

On the other hand, the playback management information fed into the playback management information input 2 shown in FIG. 2(e) is transformed into a packet of transmission format suited to transmission in a band of the transmission channel 7 of the communication media by the playback management information packet transforming means 4 as shown in FIG. 2(d).

The transmission packet generating means 5 operates, as shown in FIG. 2(c), so as to insert the packets (FIG. 2(d)) of the playback management information generated in the playback management information packet transforming means 4 into the first packet stream (FIG. 2(b)) of transmission data generated in the data packet transforming means 3 at a predetermined rate, for example, one packet of the playback management information into four data packets. In this way, the first packet stream in FIG. 2(b) and the second packet stream in FIG. 2(c) mixed with the packet stream of the playback management information in FIG. 2(d) are transmitted in the acquired band in the transmission channel 7 of communication media by the transmitting means 6.

The second packet stream may be transmitted by using one band acquired in the communication media as one packet stream as in the embodiment above, or transmitted by acquiring plural bands as described later.

Incidentally, the packet having the format suited to transmission in a band in the transmission channel in the communication media in the above explanation is formed as follows in the case of data transfer in the isochronous transmission mode of the IEEE1394.

The isochronous packet designated in the IEEE1394 is composed of a data field, an isochronous header added before and after it, data CRC as error correction data. The transmission data and the playback management information are incorporated into the data field of the isochronous packet by transforming the format in the data packet transforming means 3 and playback management information packet transforming means 4, and transformed into a format of an isochronous packet designed in the IEEE1394.

Thus, according to the embodiment, by inserting packets of the playback management information generated from the playback management information such as the procedure information and the selection information for playing back the digital video data and audio data, to the first packet stream generated from the transmission data such as digital video data and audio data, by a predetermined rate, the obtained second packet stream can be transmitted in the band acquired in the communication media. Therefore, by executing the reverse process of the above at the receiving side, the original picture and sound information can be played back correctly, or the functions of changing the playback procedure and selecting the playback information can be realized.

Moreover, in the embodiment, as mentioned above, as the communication band acquired in the communication media, the band acquired in the isochronous transmission mode of the IEEE1394 may be used, or other wired communication system or wireless communication may be employed, and the transmission data and the playback management information may be transmitted in the method of the embodiment.

In other embodiments explained successively, as the communication band acquired in the communication media, the band acquired in the isochronous transmission mode of the IEEE1394 may be used, or other wired communication system or wireless communication may be employed, and the transmission data and the playback management information may be transmitted in the methods of the individual embodiments.

In the data packet transforming means 3, when transforming the transmission data into the packet of transmission format suited to transmission in the communication acquired band, the information identifying the transmission data, the information showing the sequence of transformation into packet stream as shown in FIG. 2(b), and attribute information showing the information required in each playback function can be added to a specified position or block of a packet of the packet stream, respectively as identifier and attribute relating to data, either identifier or attribute or both. More specifically, examples of attribute relating to transmission data include the data transfer sequence and transfer mode.

Further, the playback management information packet transforming means 4, when transforming the playback management information into the packet of transmission format suited to transmission in the communication acquired band, may include the function of adding the information identifying the playback management information, the information showing the sequence of transformation into packet, and attribute information showing the information required in each playback function, to a specified position of a packet or a block composing the packet, respectively as identifier and attribute relating to playback management information, either identifier or attribute or both.

More specifically, examples of attribute relating to playback management information include the title information, contents information, information of playback sequence, text information, and time information, among others.

Besides, the transmission packet generating means 5 and transmitting means 6 may also include functions of generating plural packet streams, and transmitting by using the communication acquired band in each packet stream. That is, as shown in other operation explanatory diagram shown in FIG. 3, the transmission packet generating means 5 generates a first packet stream (FIG. 3(b)) transformed from the transmission data (FIG. 3(a)) by the data packet transforming means 3, and a packet of playback management information (FIG. 3(d)) transformed from the playback management information (FIG. 3(e)) by the playback management information packet transforming means 4, for example, the first packet stream in three packet streams (FIG. 3(c)), and the packet of playback management information in one packet stream (FIG. 3(c)), and issues packet streams having four packet streams to the transmitting means 6. The transmitting means 6, in this example, acquires four bands of transmission channel 7 of communication media, and transmits three packet streams of the first packet stream and one packet stream of the packet of playback management information, in each packet stream, by using four bands, first band to fourth band, acquired in the transmission channel 7 of the acquired communication media.

Figure 4:
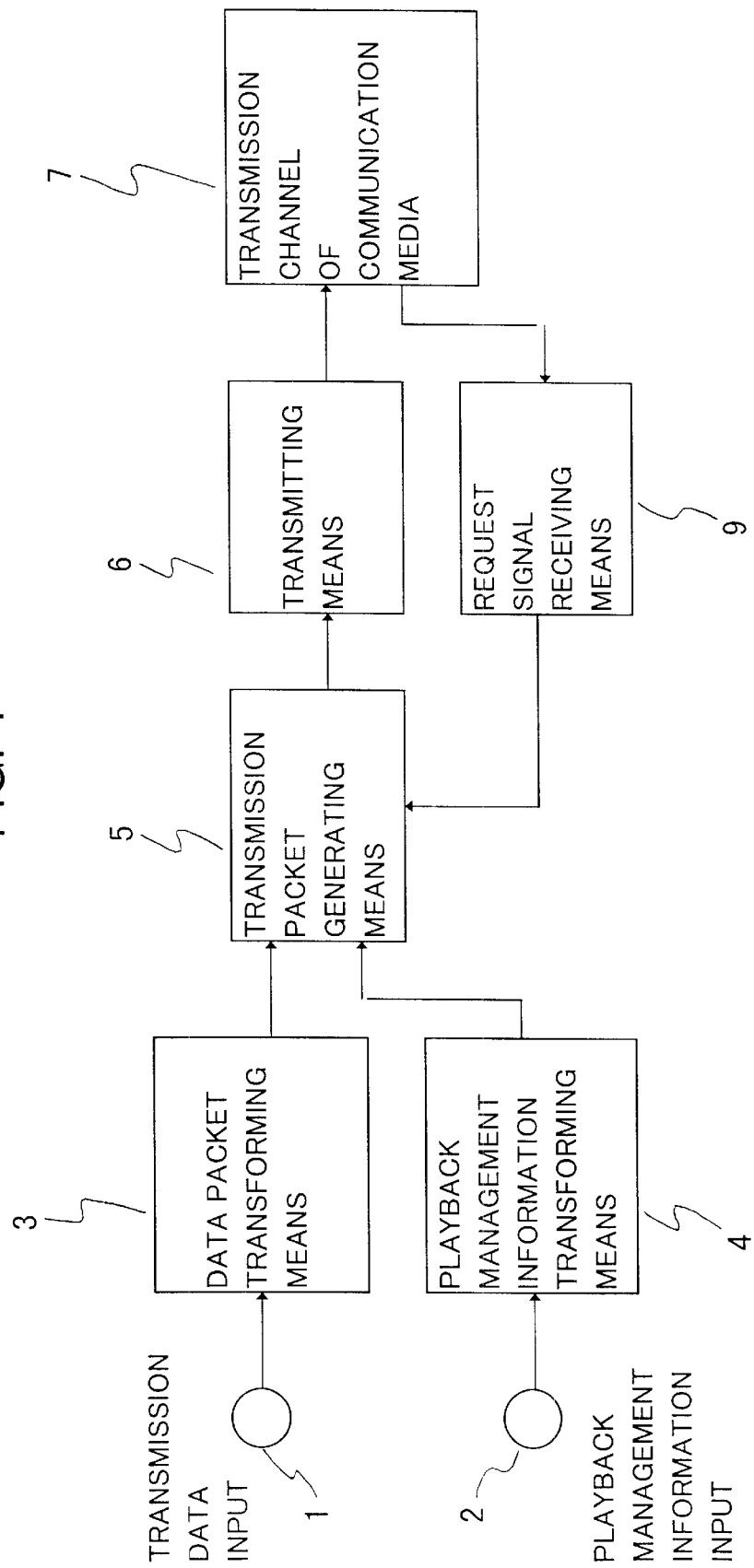
FIG. 4 is a block diagram of multiplex a data transmitting equipment in a second embodiment of the invention.

FIG. 4 is a block diagram of multiplex data transmitting equipment in a second embodiment of the invention. In FIG. 4, reference numeral 1 is a transmission data input, 2 is playback management information input, 3 is data packet transforming means, 4 is playback management information packet transforming means, 5 is transmission packet generating means, 6 is transmitting means, 7 is a transmission channel of communication media, and 9 is request signal receiving means.

In thus constituted multiplex data transmitting equipment of the second embodiment, the operation is described below.

The transmission data obtained at the transmission data input 1 is transformed into a packet stream of a transmission format suited to transmission in the band of the transmission channel 7 of communication media acquired by the data packet transforming means 3. On the other hand, the playback management information obtained at the playback management information input 2 is transformed into a packet of transmission format suited to transmission in the band acquired in the transmission channel 7 of communication media by the playback management information packet transforming means 4.

The transmission packet generating means 5 executes the operation of inserting packets of playback management information generated in the playback management information packet transforming means 4 into the a first packet stream of transmission data generated in the data packet transforming means 3 at a specified rate. The output of the transmission packet generating means 5, that is, a second packet stream mixing the first packet stream and the packet stream of playback management information is transmitted in the acquired band by the transmitting means 6.

Furthermore, using a band other than the acquired band, the request signal receiving means 9 receives a request signal. This request signal requests output of the playback management information packet, or requests to designate newly the rate of inserting the packets of playback management information obtained in the playback management information packet transforming means 4 into the first packet stream from the transmission data generated in the data packet transforming means 3. The request signal receiving means 9, depending on the received request signal, designates the output of playback management information packet, or designates the inserting rate of packets of playback management information in the transmission packet generating means 5.

In the case of transmission according to the IEEE1394, meanwhile, as other band than the acquired band, by using the asynchronous transmission mode designated in the IEEE1394, the band in the time after isochronous transmission in each cycle can be utilized. As the format of packet suited to transmission in the band other than the communication acquired band, the asynchronous packet format designated in the IEEE1394 may be used.

Thus, according to the embodiment, by the request from the reception side, it is possible to start or stop of transmission of second packet stream mixing packets of playback management information and packet stream of transmission data such as digital video data and audio data at a specified rate, or designate the mixing rate newly, which realizes the functions of correctly playing back the original picture or sound information at the receiving side, and changing the playback procedure or selecting the playback information flexibly depending on request.

Figure 5:
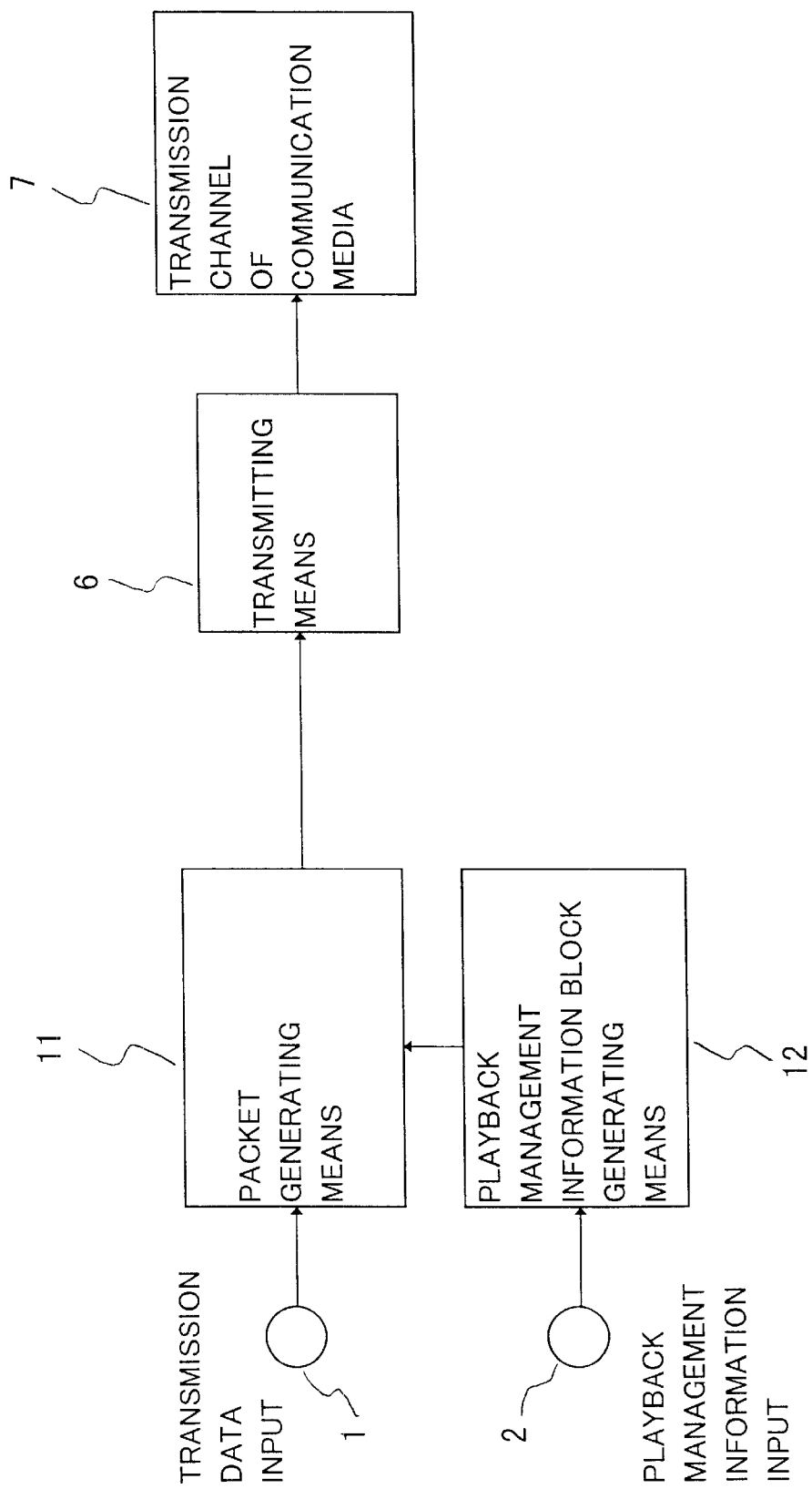
FIG. 5 is a block diagram of a multiplex data transmitting equipment in a third embodiment of the invention.

FIG. 5 is a block diagram of multiplex data transmitting equipment in a third embodiment of the invention. In FIG. 5, reference numeral 1 is a transmission data input, 2 is playback management information input, 6 is transmitting means, 7 is a transmission channel of communication media, 11 is packet generating means, and 12 is playback management information block generating means.

In thus constituted multiplex data transmitting equipment of the third embodiment, the operation is described below.

The playback management information block generating means 12 divides the playback management information obtained in the playback management information input 2 into first blocks of a specified size, for example, about several bytes, and further adds identifiers to the first blocks to generate second blocks. The identifier shows the information for restoring the playback management information from the second block, for example, information such as relative block address and attribute showing the kind of playback management information.

The packet generating means 11 transforms the transmission data obtained from the transmission data input 1 into a packet of transmission format suited to transmission in the acquired band, and operates to insert the second block into specified region of packet when transforming the transmission data into packet.

The packet of transmission data inserting the second block acquired in the packet generating means 11 is transmitted in the acquired band by the transmitting means 6.

Thus, according to the embodiment, by inserting the block generated from the playback management information such as procedure information and selection information for playing back digital video data or audio data, into the packet generated from the transmission data such as digital video data or audio data, the playback management information can be generated by collecting the blocks at the receiving side, and the playback processing at the receiving side is easier, and the original picture and sound information can be played back correctly, and the playback procedure can be changed or playback information can be selected easily.

Figure 6:
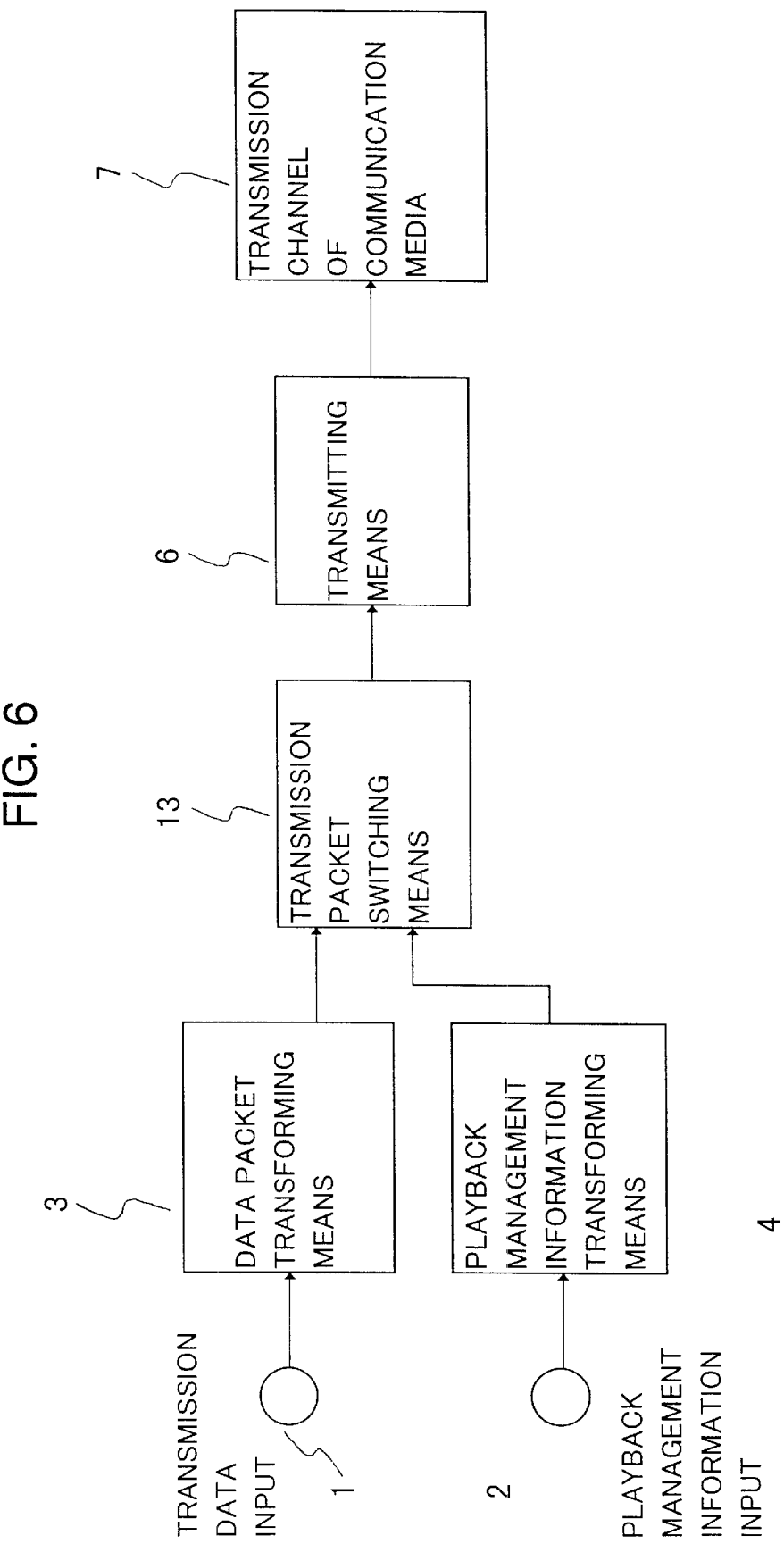
FIG. 6 is a block diagram of a multiplex data transmitting equipment in a fourth embodiment of the invention.

FIG. 6 is a block diagram of multiplex data transmitting equipment in a fourth embodiment of the invention. In FIG. 6, reference numeral 1 is a transmission data input, 2 is playback management information input, 3 is data packet transforming means, 4 is playback management information packet transforming means, 6 is transmitting means, 7 is a transmission channel of communication media, and 13 is transmission packet switching means.

In thus constituted multiplex data transmitting equipment of the fourth embodiment, the operation is described below.

The transmission data fed into the transmission data input 1 is transformed into a first packet stream of transmission format suited to transmission in the acquired band in communication media by the data packet transforming means 3. On the other hand, the input playback management information in the playback management information input 2 is transformed into a packet of transmission format suited to transmission in the acquired band in communication media by the playback management information packet transforming means 4.

The transmission packet switching means 13 adds the first packet stream of transmission data generated in the data packet transforming means 3 sequentially to the beginning packet of playback management information generated in the playback management information packet transforming means 4, and generates a second packet stream mixing the packet of playback management information and first packet stream.

The second packet stream is transmitted in the acquired band by the transmitting means 6.

Thus, according to the embodiment, by transmitting the playback management information including the procedure information and the selection information for playing back the digital video data or audio data before transmission of transmission data such as digital video data or audio data, it is easier to discriminate the transmission data and the playback management information and acquire and process the playback management information at the receiving side, and therefore the original picture or sound information can be played back correctly, or a change of playback procedure or selection of playback information may be realized easily.

The data packet transforming means 3 may include a function of, when transforming the transmission data into the packet of transmission format suited to the transmission in the acquired band, adding the information identifying the transmission data, the information showing the sequence of transformation into the packet stream, and attribute information showing the information required in each playback function, to a predetermined position or blocks of the packet of the packet stream, respectively as the identifier and the attribute relating to transmission data, either identifier or attribute or both.

The playback management information packet transforming means 4 may include a function of, when transforming the playback management information into the packet of transmission format suited to transmission in the acquired band, adding the information identifying the playback management information, the information showing the sequence of transformation into packet, and attribute information showing the information required in each playback function, to a specified position or block of the packet, respectively as identifier and attribute relating to playback management information, either identifier or attribute or both.

Figure 7:
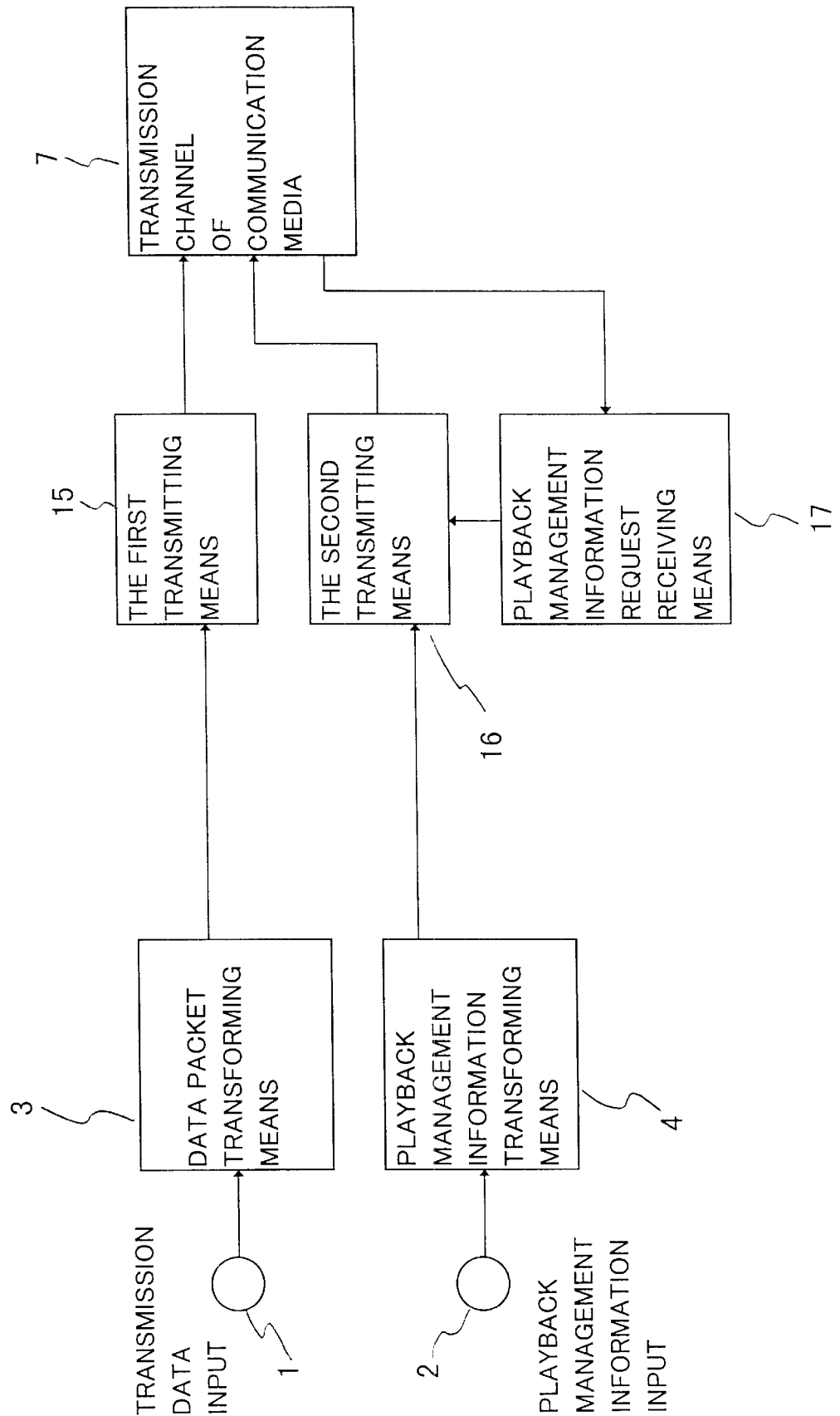
FIG. 7 is a block diagram of a multiplex data transmitting equipment in a fifth embodiment of the invention.

FIG. 7 is a block diagram of multiplex data transmitting equipment in a fifth embodiment of the invention. In FIG. 7, reference numeral 1 is a transmission data input, 2 is a playback management information input, 3 is data packet transforming means, 4 is playback management information packet transforming means, 7 is a transmission channel of communication media, 15 is first transmitting means, 16 is second transmitting means, and 17 is playback management information request receiving means.

In thus constituted multiplex data transmitting equipment of the fifth embodiment, the operation is described below.

The transmission data fed into the transmission data input 1 is transformed into a packet stream in transmission format suited to transmission in the acquired band in the communication media by the data packet transforming means 3, and is transmitted in the acquired band in the communication media by the first transmitting means 15.

The playback management information obtained at the playback management information input 2 is transformed into a packet suited to transmission in other band than the acquired band in the communication media by the playback management information packet transforming means 4.

The playback management information request receiving means 17 receives a signal requesting transmission of the output of the playback management information packet transforming means 4 from the receiving side by utilizing other band than the acquired band in the communication media. Depending on the result of reception of the playback management information request receiving means 17, the second transmitting means 16 transmits the packet of playback management information transformed in the playback management information packet transforming means 4 by using other band than the acquired band in the communicationmedia.

In the case of transmission according to the IEEE1394, meanwhile, as other band than the acquired band in the communication media, by using the asynchronous transmission mode designated in the IEEE1394, the band in the time after isochronous transmission in each cycle can be utilized. As the format of packet suited to the transmission in the band other than the acquired band in the communication media, the asynchronous packet format designated in the IEEE1394 may be used.

Thus, according to the embodiment, by transmitting transmission data such as digital video data and audio data in the acquired band in the communication media, and transmitting playback management information including the procedure information and the selection information for playing back digital video data and audio data in other band than the acquired band in the communication media depending on the request from the receiving side, the receiving side can discriminate the data and the playback management information and receive and process the playback management information easily. Therefore, it realizes the functions of correctly playing back the original picture and sound information, and changing the playback procedure or selecting the playback information flexibly depending on request at the receiving side.

A multiplex data receiving equipment in sixth to ninth embodiments of the invention is described below while referring to FIG. 8 to FIG. 12.

Figure 8:
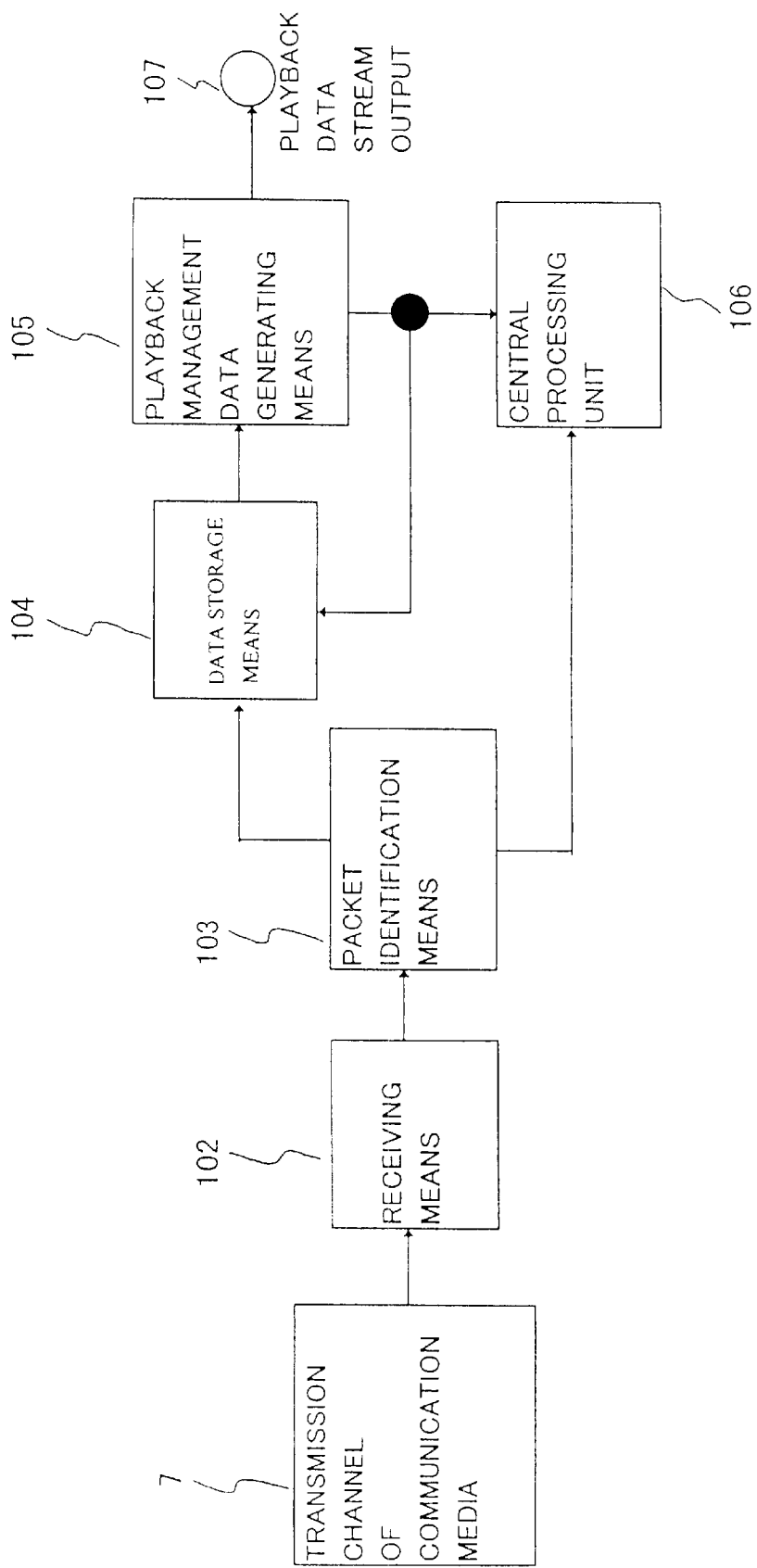
FIG. 8 is a block diagram of a multiplex data receiving equipment in a sixth embodiment of the invention.
Figure 9:
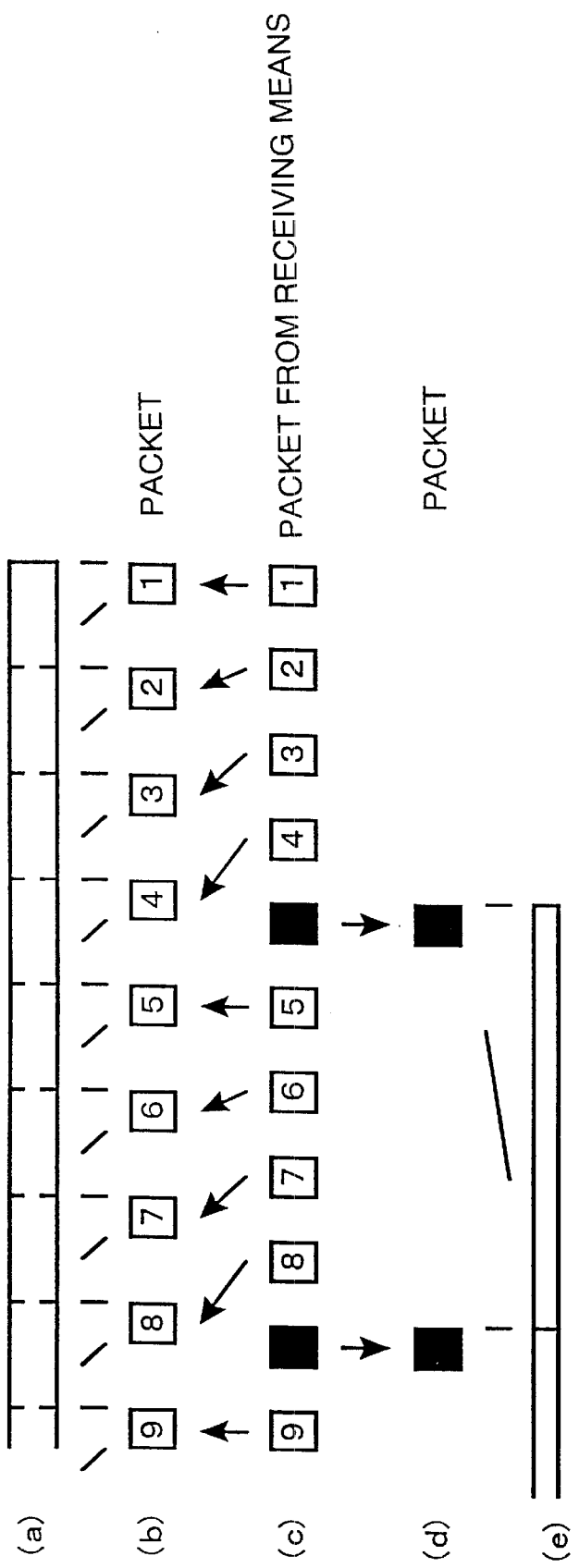
FIG. 9 is an operation explanatory diagram of the multiplex data receiving equipment in the sixth embodiment of the invention.

FIG. 8 is a block diagram of a multiplex data receiving equipment in a sixth embodiment of the invention, and FIG. 9 is its operation explanatory diagram. In FIG. 8, reference numeral 7 is a transmission channel of the communication media, 102 is receiving means, 103 is packet identification means, 104 is data storage means, 105 is playback data generating means, 106 is a central processing unit, and 107 is a played-back data stream output.

In thus constituted multiplex data receiving equipment of the sixth embodiment of the invention, the operation is described below while referring to FIG. 8 and FIG. 9.

The signal transmitted by using the band acquired by the transmitting equipment (not shown) through the transmission channel 7 of communication media is received by the receiving means 102. FIG. 9(*c*) shows the received signal. The signal issued from the receiving means 102 is discriminated and issued as data such as digital video data or audio data, and playback management information, by the packet identification means 103. That is, the received signal shown in FIG. 9(*c*) is separated into a packet stream in FIG. 9(*b*) showing data such as digital video data or audio data, and FIG. 9(*d*) showing playback management information. In the case of FIG. 9, the reception data is composed of four packets of data such as digital video data and audio data, and one packet of the playback management information.

The packet of playback management information obtained in the packet identification means 103 shown in FIG. 9(*d*) is combined with the playback management information as shown in FIG. 9(*e*) by the central processing unit 106, and is further processed in the central processing unit 106, and is generated as playback information for playing back data such as digital video data and audio data.

On the other hand, the packet stream of digital video data and audio data obtained in the packet identification means 103 shown in FIG. 9(*b*) is stored as a series of data as shown in FIG. 2(*a*) in the data storage means 104. The stored data holds the information showing the relative relation as data such as relative address.

The data stored in the data storage means 104 is controlled of reading by the central processing unit 106, and the result of reading is input into the playback data generating means 105. In the playback data generating means 105, the input data is transformed into a played-back data stream by execution of processing conforming to the playback information generated in the central-processing unit 106, and is issued into the played-back data stream output 107.

Thus, according to the embodiment, when the packet stream into which data such as digital video data and audio data and the playback management information for playing them back at are inserted a specified rate is transmitted in the same band of the communication media, the data such as digital video data and audio data and playback management information for playing back the digital video data and audio data are separated, and the original digital video data and audio data can be played back correctly by using these signals, and functions of changing the playback procedure and selecting the playback information can be realized in the receiving equipment.

The packet identification means may also include a function of separating the packet stream of the above data, or the packet stream of data by using an identifier added to a specified position or block of the playback management information packet, from the packet of playback management information, in order to identify and recognize the packet stream of data such as digital video data and audio data received by the receiving means, and the packet of playback management information for playing back the digital video data and audio data.

Figure 10:
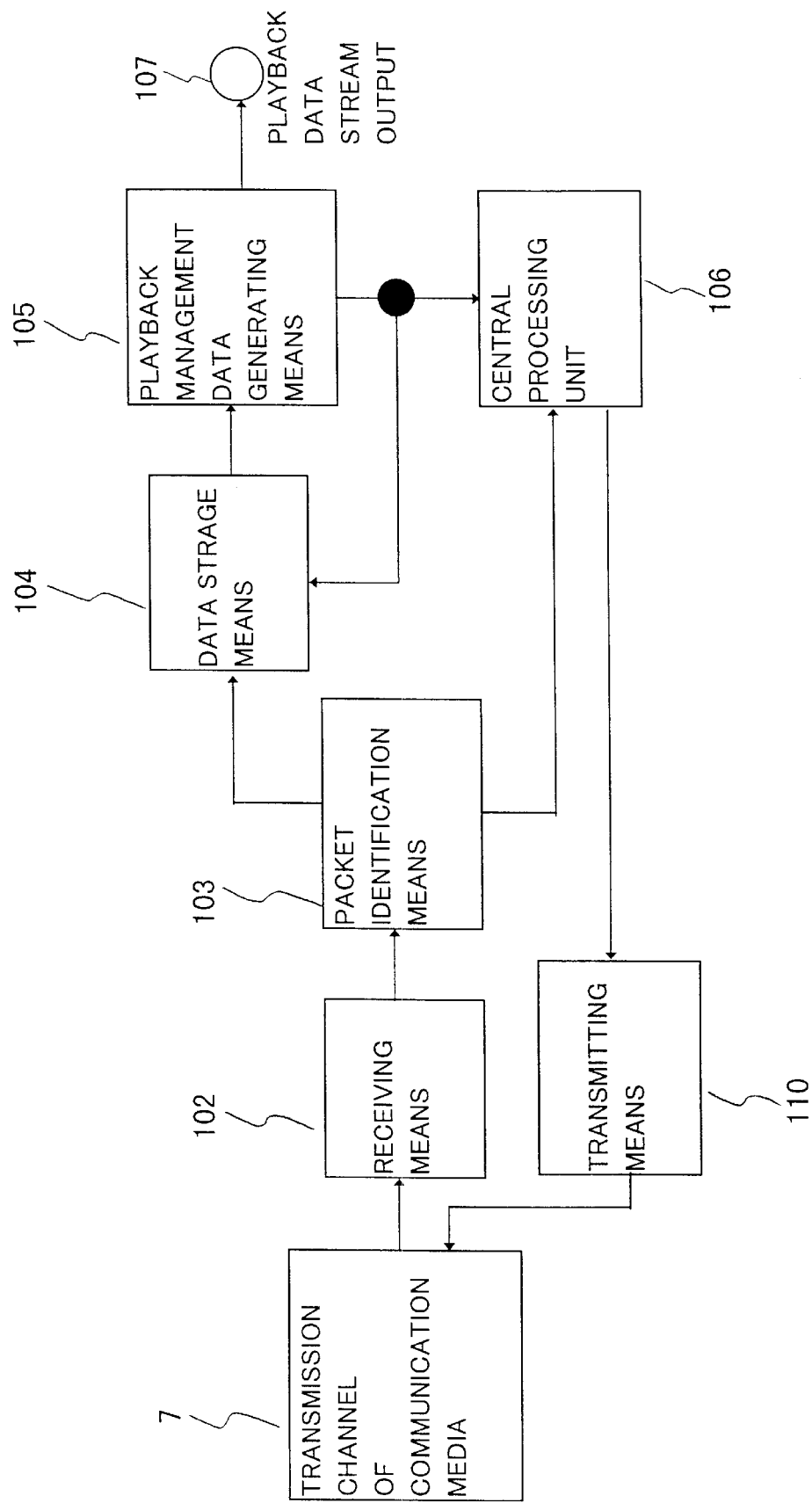
FIG. 10 is a block diagram of a multiplex data receiving equipment in a seventh embodiment of the invention.

FIG. 10 is a block diagram of multiplex data receiving equipment in a seventh embodiment of the invention. In FIG. 10, reference numeral 7 is a transmission channel of communication media, 102 is receiving means, 103 is packet identification means, 104 is data storage means, 105 is playback data generating means, 106 is a central processing unit, 107 is a played-back data stream output, and 110 is transmitting means.

In thus constituted multiplex data receiving equipment, the operation is described below.

The signal transmitted by using the band acquired by the transmitting equipment (not shown) through the transmission channel 7 of the communication media is received by the receiving means 102 and is issued to the packet identification means 103. The signal issued from the receiving means 102 is separated and issued as data such as digital video data or audio data, and playback management information, by the packet identification means 103.

The packet of playback management information obtained in the packet identification means 103 is combined with the playback management information by the central processing unit 106, and is further processed in the central processing unit 106, and is generated as playback information for playing back data such as digital video data and audio data.

On the other hand, the packet stream of digital video data and audio data obtained in the packet identification means 103 is stored as a series of data in the data storage means 104. The stored data holds the information showing the relative relation as data such as a relative address. Reading out the data stored in the data storage means 104 is controlled by the central processing unit 106, and the result of reading-out is put into the playback data generating means 105. In the playback data generating means 105, the output of the data storage means 104 is processed according to the playback information generated in the central processing unit 106, and the played-back data stream of the original digital video data and audio data is obtained, and the obtained result is issued to the played-back data stream output 107.

Moreover, the central processing unit 106 generates a request signal for a start or stop of insertion of a playback management information packet in the packet stream of digital video data and audio data, or a request signal for designating the inserting rate, to the transmitting equipment, and issues to the transmitting means 110. The transmitting means 110, using the band other than the acquired band in the communication media, transmits the above request to the transmitting equipment.

Thus, according to the embodiment, by the request from the receiving side, by designating to start or stop insertion of packet of playback management information into data packet stream of digital video data and audio data, or change of inserting rate, the data such as digital video data and audio data, and the playback management information for playing back the digital video data and audio data can be optimally separated and processed, and the original digital video data and audio data can be played back correctly by using these signals, so that functions of changing the playback procedure and selecting the playback information flexibly depending on the request can be realized in the receiving equipment.

The request signal to the transmitting means 110 generated in the central processing unit 106 may include functions of increasing or decreasing the number of acquired bands in the communication media acquired by the transmitting equipment, changing the rate of inserting packets of playback management information into the packet stream of data such as digital video data and audio data, and requesting start and stop of insertion of packets of playback management information into the packet stream of data such as digital video data and audio data.

Figure 11:
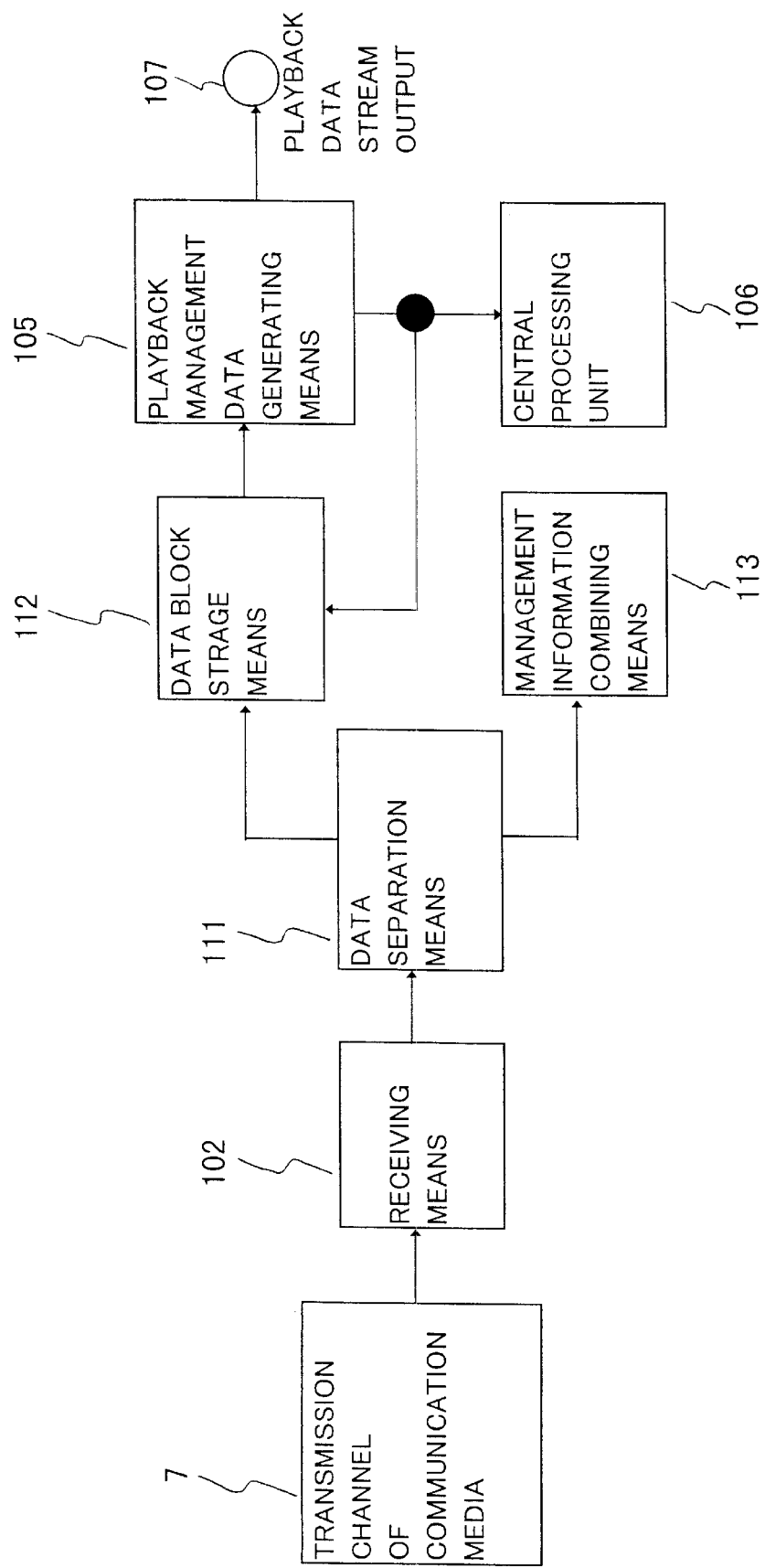
FIG. 11 is a block diagram of a multiplex data receiving equipment in an eighth embodiment of the invention.

FIG. 11 is a block diagram of multiplex data receiving equipment in an eighth embodiment of the invention. In FIG. 11, reference numeral 7 is a transmission channel of communication media, 102 is receiving means, 105 is playback data generating means, 106 is a central processing unit, 107 is a played-back data stream output, 111 is data separation means, 112 is data block storage means, and 113 is management information combining means.

In thus constituted multiplex data receiving equipment, the operation is described below.

The signal transmitted by using the band acquired by the transmitting equipment (not shown) through the transmission channel 7 of the communication media is received by the receiving means 102 and is issued to the data separating means 111.

A packet in the packet stream of signals obtained in the receiving means 102 includes both blocks of the playback management information in a specified size, for example, about several bytes, and the packet generated from the data such as digital video data and audio data by the transmitting equipment. The block in the specified size includes the identifier necessary for restoring into the original playback management information, for example, the relative address of block or attribute showing the kind of playback management information.

The signal of packet stream obtained in the receiving means 102 is separated and issued as the block of data such as digital video data or audio data, and block of playback management information, by the data separating means 111.

By storing the block of playback management information issued from the data separating means 111 sequentially by the management information combining means 113, or storing according to the information of the identifier, the original playback management information is generated. By using the playback management information obtained in the management information combining means 113, the central processing unit 106 generates playback information necessary for playing back the data such as digital video data and audio data.

On the other hand, the block of data such as digital video data and audio data issued from the data separating means 111 is stored as a series of data in the data block storage means 112. However, the stored data holds the information showing the relative relation as data such as relative address.

The block of data stored in the data block storage means 112 is controlled of reading by the central processing unit 106, and the result of reading is put into the playback data generating means 105. In the playback data generating means 105, the entered data is transformed into the played-back data stream by the execution of processing according to the playback information generated in the central processing unit 106, and is issued to the played-back data stream output 107.

Thus, according to the embodiment, when receiving the signal inserting the block of playback management information into the packet of digital video data and audio data, by separating the divided block of playback management information and data such as digital video data and audio data from the reception signal packet, and generating the original digital video data and audio data by using these signals, playback processing can be done easily and securely in the receiving equipment. Therefore, the playback data such as original digital video data and audio data can be played back correctly, and functions of changing the playback procedure and selecting the playback information can be realized in the receiving equipment.

Figure 12:
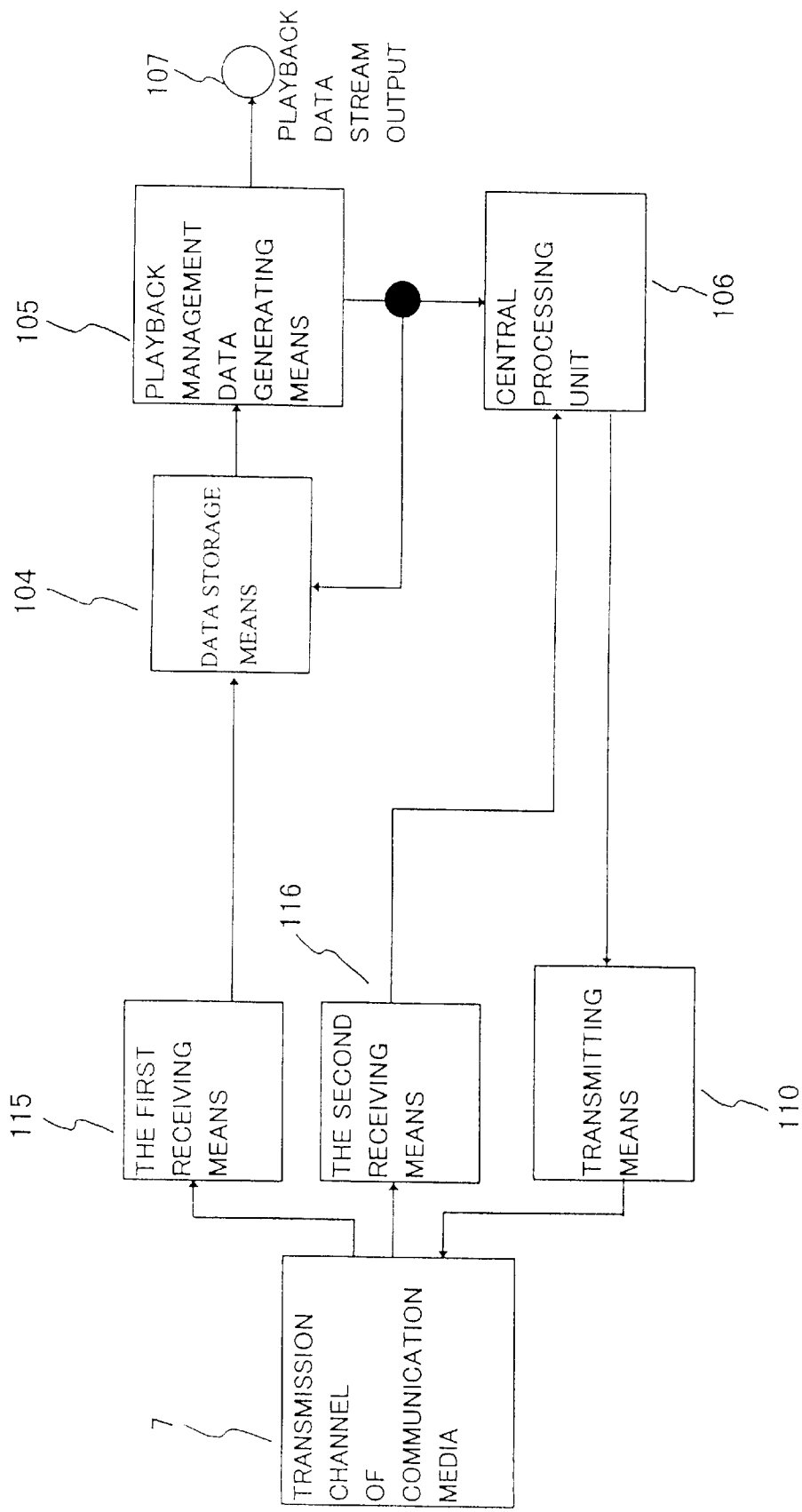
FIG. 12 is a block diagram of a multiplex data receiving equipment in a ninth embodiment of the invention.

FIG. 12 is a block diagram of multiplex data receiving equipment in a ninth embodiment of the invention. In FIG. 12, reference numeral 7 is a transmission channel of communication media, 104 is data storage means, 105 is playback data generating means, 106 is a central processing unit, 107 is a played-back data stream output, 110 is transmitting means, 115 is first receiving means, and 116 is second receiving means.

In thus constituted multiplex data receiving equipment, the operation is described below.

The signal transmitted by using the band acquired by the transmitting equipment (not shown) through the transmission channel 7 of the communication media is received by the first receiving means 115, and is issued to the data storage means 104.

The second receiving means 116 receives the packet of playback management information by using a band in the communication media other than the acquired band, and issues to the central processing unit 106. The packet of the playback management information is processed in the central processing unit 106, and is generated into the playback information for playing back the data such as digital video data and audio data.

On the other hand, the packet stream of digital video data and audio data obtained in the first receiving means 115 is stored as a series of data in the data storage means 104. However, the stored data holds the information showing the relative relation as data such as relative address. The data stored in the data storage means 104 is controlled of reading by the central processing unit 106, and the result of reading is put into the playback data generating means 105. In the playback data generating means 105, the output of the data storage means 104 is processed according to the playback information generated in the central processing unit 106, and the played-back data stream of the original digital video data and audio data is obtained, and the obtained result is issued to the played-back data stream output 107.

Moreover, the central processing unit 106 generates a request signal of start or stop of insertion of packet of playback management information in the packet stream of digital video data and audio data, or a request signal for designating the inserting rate, to the transmitting equipment, and issues to the transmitting means 110. The transmitting means 110, using the band other than the acquired band in the communication media, transmits the above request to the transmitting equipment.

Thus, according to the embodiment, by receiving the packet of data such as digital video data and audio data in the band acquired by the transmitting equipment, and receiving the playback management information including the procedure information and selection information for playing back the digital video data and audio data in other band than the acquired band according to the request from the receiving side, in the receiving equipment, discrimination of data such as digital video data and audio data and playback management information and acquisition and processing of playback management information can be done easily. Therefore, functions of playing back the original digital video data and audio data correctly, and changing the playback procedure and selecting the playback information can be realized in the receiving equipment flexibly depending on the request.

Same as explained in the first embodiment, in the subsequent embodiments, as the band of communication media, the band acquired in the isochronous transmission mode of the IEEE1394 may be used, or by other wired or wireless communication method, the transmission data and playback management information may be transmitted or received by the method explained in the foregoing embodiments.

In the seventh embodiment, same as explained in the second embodiment, when transmitting data according to the IEEE1394, the request signal can be received by transmitting in the asynchronous transmission mode of the IEEE1394. Or, by using other wired or wireless communication method, the playback management information can be transmitted or received.

Similarly, in the ninth embodiment, same as explained in the fifth embodiment, when transmitting data according to the IEEE1394, the playback management information and request signal can be received by transmitting in the asynchronous transmission mode of the IEEE1394. Or, by using other wired or wireless communication method, the playback management information can be transmitted or received.

Thus, according to the multiplex data transmitting equipment of the invention, together with transmission data such as digital video data, audio data and text data, the playback management information including procedure information and selection information for playing back the picture and sound can be transmitted, and therefore the function for playing back the original picture and sound information correctly, and the function of changing the playback procedure and selecting playback information can be realized at the receiving side.

Moreover, the multiplex data receiving equipment of the invention can receive the data such as digital video data and audio data and the playback management information for playing them back, and therefore the function for playing back the original digital picture and sound correctly by using such information, and the function of changing the playback procedure and selecting the playback information can be realized.

These functions of the multiplex data transmitting equipment and multiplex data receiving equipment are particularly effective when playing back the information such as picture, sound and text by accessing from an external device to the data mixing the information such as picture, sound and text and the management information used in playback, such as the data digitally recorded in the recording medium.

More specifically, even in the above case, for playing back the recorded information by accessing from external device to the digital recording medium such as DVD, it is particularly effective when using the data transfer means for transferring data by acquiring the communication band used for data transfer requiring real-time transfer such as the IEEE1394.

What is claimed is:

1. Multiplex data transmitting equipment comprising:

data packet transforming means for transforming input transmission data into a packet of transmission format suited to transmission in a band acquired in communication media;

playback management information packet transforming means for transforming playback management information for utilizing said transmission data into a packet of transmission format suited to transmission in said acquired band;

request signal receiving means for receiving a signal requesting an output of playback management information packet in other band than said acquired band, or receiving a signal requesting a change of rate of inserting the packets of said playback management information obtained in the playback management information packet transforming means into the first packet stream from the transmission data generated in the data packet transforming means;

transmission packet generating means for generating a second packet stream wherein packets of data and packets of playback management information are mingled by starting an insertion of packets of said playback management information obtained in said playback management information packet transforming means into the first packet stream from said transmission data generated in said data packet transforming means depending on the request from the request signal receiving means, or inserting the packets of said playback management information at a requested rate; and transmitting means for transmitting the second packet stream obtained in said transmission packet generating means in said acquired band.

2. Multiplex data receiving equipment comprising:

receiving means for receiving input reception data in a band acquired in communication media;

packet identification means for identifying and separating a packet stream of data and packet of playback management information from the packet stream of reception data received in said receiving means, and issuing individually;

central processing means for generating management information for managing playback of a packet stream of data in said reception data by using the playback management information packet issued from said packet identification means, and generating a signal for requesting a setting change of transmission relating to the playback management information packet in said reception data at the transmission side for issuing said reception data;

transmitting means for transmitting a signal requesting setting change of said reception data generated in said central processing means by using other band than said acquired band to the transmission side of said reception data;

data storage means for storing a packet stream of data issued from said packet identification means, and controlling the output by using the management information generated in said central processing means; and played-back data generating means for generating a played-back data stream from the output of said data storage means by using the management information generated in said central processing means.

3. Multiplex data receiving equipment of claim 2, wherein the signal requesting setting change of transmission relating to the playback management information packet in the reception data generated in the central processing means has a function of requesting at least one of a request of increase or decrease in the number of bands acquired in the communication media, a request of change of rate of inserting packets of playback management information into the packet stream of data, and a request of start or stop of insertion of packets of playback management information into the packet stream of data.

* * * * *